US006285147B1

(12) United States Patent
Andersson

(10) Patent No.: US 6,285,147 B1
(45) Date of Patent: *Sep. 4, 2001

(54) ACTUATOR FOR ELECTRICAL SWITCHING DEVICE

(75) Inventor: Anders Andersson, Sollefteå (SE)

(73) Assignee: ABB Nordkomponent AB, Solleftea (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,090

(22) PCT Filed: Oct. 31, 1996

(86) PCT No.: PCT/SE96/01404

§ 371 Date: Jun. 23, 1998

§ 102(e) Date: Jun. 23, 1998

(87) PCT Pub. No.: WO97/16841

PCT Pub. Date: May 9, 1997

(30) Foreign Application Priority Data

Nov. 1, 1995 (SE) .......... 9503859-2

(51) Int. Cl.[7] .......... H02P 1/00

(52) U.S. Cl. .......... 318/280

(58) Field of Search .......... 318/280–286, 318/467; 335/65, 68, 69, 71, 73; 296/121; 200/61.8, 61.84

(56) References Cited

U.S. PATENT DOCUMENTS 3,733,747 * 5/1973 Fox et al. .......... 49/30
4,344,252 * 8/1982 Suzuki et al. .......... 49/199
4,556,832 * 12/1985 Rollins .......... 318/467
4,659,141 * 4/1987 Masuda et al. .......... 296/223
4,774,443 9/1988 Herzig .......... 318/293
4,845,321 * 7/1989 Miki .......... 200/61.84
4,940,903 7/1990 Brown, Jr. et al. .......... 307/122
5,184,050 * 2/1993 Harada et al. .......... 318/467
5,186,516 * 2/1993 ALexander et al. .......... 296/121
5,334,919 8/1994 Willard .......... 318/375
5,523,661 * 6/1996 Okada et al. .......... 318/264
5,808,532 * 9/1998 DiVincenzo et al. .

FOREIGN PATENT DOCUMENTS

3114727 * 11/1981 (DE) .
3114727 A1 10/1982 (DE) .
0 185 238 6/1986 (EP) .
WO 90/08391 7/1990 (WO) .

* cited by examiner

*Primary Examiner*—Jonathan Salata
(74) *Attorney, Agent, or Firm*—Connolly Bove Lodge & Hutz

(57) ABSTRACT

An operating device for operation of an electric switching device comprising a motor and a carrier, which includes a driving part and a driven part, whereby the motor, via the driving part transmits a movement to the driven part, which is in mechanical connection with the electric switching device. The driving part has, from an initial position, a closing direction and an opening direction and returns to the initial position after a completed operation. Between the driving part and the driven part, there is a play which allows a manual operation.

11 Claims, 2 Drawing Sheets

A - A

ACTUATOR FOR ELECTRICAL SWITCHING DEVICE

TECHNICAL FIELD

The present invention relates to a motor-operated operating device and a method for operation of an electric switching device. The operating device is intended for connection to an electric switching device and, in particular, to an electric switching device with a rotating operating shaft with different directions for closing and opening operations.

BACKGROUND ART

Certain switch disconnectors, for example ABB Kraft AB's switch disconnector of type NAL/NALF designed for medium voltage, have an operating spring in the form of a torsion spring, which gives the contacts of the disconnector a rapid movement upon opening and closing of the disconnector. The operating spring is mechanically connected to an operating shaft for tensioning the spring and to the contacts of the disconnector. In one embodiment of this disconnector, the spring is tensioned with the aid of an operating device connected to the operating shaft until a dead center is passed, whereby opening and closing, respectively, take place. In another embodiment, the operating spring is tensioned but the movement is stopped after passage of the dead center. The relevant operation can then be released with the aid of, for example, a release magnet.

Prior art motor-operated devices have a screw driven by an electric drive motor by means of a gear comprising a worm gear. A nut is moved axially along the screw upon rotation thereof, and the nut is connected to the operating spring of the disconnector via a lever mechanism. It has proved that the screw is subjected to large axial forces and that large frictional forces arise in the mechanism. This makes possible a strong construction of the operating device and a drive motor with such a high power that, for economical reasons, an ac motor is required. The mechanism is also relatively complicated. These factors result in a high manufacturing cost. The high motor power also increases the costs of control and switching means for the drive motor of the operating device and make it difficult or impossible to provide battery stand-by operation of the operating device in an economically reasonable way.

From DE 311 47 27, a spring-operated operating device is known, the object of which is to provide a simple and space-saving device where a drive spring common to both directions carries out the operating movement rapidly. The operating device comprises a motor-driven drive pulley which, via a pin, drives a first cam disk in which the operating spring is arranged. The first cam disk drives, via a pin, a second cam disk which is connected to an electric switching device. The drive pulley engages with the first cam disk after a rotation of about 90°, whereupon the drive pulley rotates the first cam disk with the drive spring applied thereon to an upper dead-center position at about 180°, in which the first cam disk engages with the second cam disk. When the dead-center position has been passed, the cam disks continue the movement of the force from the drive spring, whereby switching takes place. During each operation, the drive pulley and the first cam disk move one full turn, which means that a manual operation of an electric switching device with one closing and one opening direction cannot be carried out. A disadvantage of the known device is that three discs are needed to make possible one operation. A further drawback with the device is that an operating spring is used and that this must be pre-stressed by a motor.

The spring must therefore be oversized by about 20% to give sufficient safety and to overcome friction losses. The motor, in turn, must be oversized by about 20% to be able to prestress the operating spring in a reliable manner.

One further disadvantage of these prior art operating devices is that they have insufficient flexibility during mounting, that is, that they cannot be mounted in an arbitrary manner in relation to the disconnector, for example on an optional side of the disconnector.

SUMMARY OF THE INVENTION

The invention aims to provide a motor-operated device, which

- has fewer components and may be given a simpler and more compact design,
- may be manufactured at a lower cost,
- requires lower drive motor power,
- has a high flexibility as regards mounting, and which allows manual operation of the electric switching device by means of an operating handle or the like without being obstructed by the operating device.

By arranging the operating device with one driving part and one driven part, between which a play is arranged which corresponds to the movement of a complete operation, the need of an additional component to complete the operation is eliminated. In the device according to the invention, the screw mechanism is completely eliminated and replaced by rotating components in the form of a rotating carrier means. In this way, the large axial forces of the prior art devices are completely eliminated. The large friction losses from which the known devices suffer are also considerably reduced. This, in turn, permits the mechanism to be made simpler and more compact and with fewer components, permits the drive motor to be designed for considerably lower power, and thus permits the necessary components for switching and control of the drive motor to be made simpler and less expensive. Altogether, this means that an operating device according to the invention can be manufactured at a cost which is greatly reduced compared with what has previously been possible.

Further, an operating device according to the invention is given maximum flexibility during the mounting, where necessary after a simple switching of the direction of rotation of the drive motor. It may be mounted on an optional side of a disconnector or another electric switching device, it may be mounted upside down, etc.

The low necessary driving power allow the drive motor to constitute a dc motor for low power. It has proved that in a typical operating device according to the invention, the required drive motor power is reduced to only 10–15% of the power of corresponding prior art operating devices. In addition to the positive effect this has on the cost, weight and space requirement of the device, it has the positive effect that the motor, upon voltage drop out during operational disturbances, can be driven by a stand-by battery.

In a preferred embodiment of the invention, one of the two parts of the carrier means is made as an operating wheel with a carrier and the other part as a cam disk coaxially rotating with the operating wheel. The operating wheel then suitably constitutes the driving part of the carrier means and is designed as a gear wheel, driven by the drive motor via the gear, with a carrier applied to the gear wheel, which provides a simple design of the operating device.

In a preferred embodiment of the invention, a spur gear (a straight-toothed spur gear with parallel input and output shafts) is arranged between the drive motor and the carrier means, which results in a low manufacturing cost and low friction losses.

Preferably, the operating device is designed such that the driving part of the carrier means after an operation is always returned to an original position by the drive motor. In this way, the advantage is achieved that the electric switching device, in a simple manner, can always be operated manually without being obstructed by the operating device.

The advantageous properties of an operating device according to the invention make possible the use of remote operation of disconnectors to a considerably greater extent than what has been previously practically and economically possible, which entails considerable advantages for the operation of a switchgear installation.

BRIEF DESCRIPTION OF THE DRAWINGS

The invention will be described in greater detail in the following with reference to the accompanying FIGS 1*a,* 1*b* and 2, wherein.

DETAILED DESCRIPTION OF THE PREFERRED EMBODIMENTS

Figure 1A:
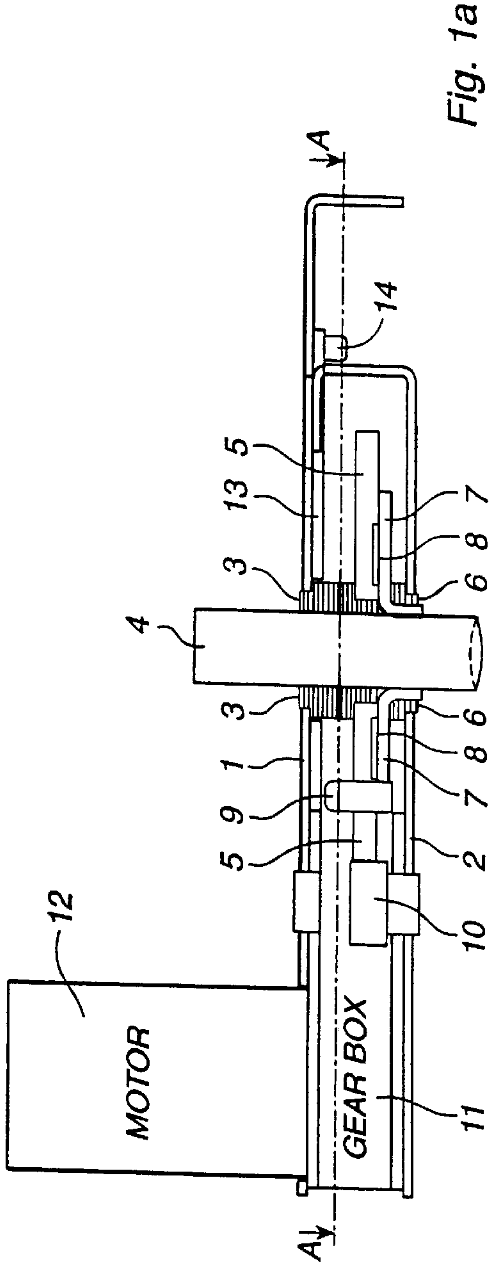
FIG. 1*a* shows the operating device viewed in a direction which is perpendicular to the axes of the device.

As is clear from FIG. 1, the operating device has a chassis with parallel end members 1 and 2 and is made of zinc-plated steel sheet. In the end member 1 a first sliding bearing 3 of a suitable plastic material is arranged. The operating device is intended to be mounted on an electric switching device (not shown) in such a way that the free end of the operating shaft 4 of the electric switching device is able to rotate in the bearing. An operating wheel in the form of a gear wheel 5 is journalled in the lower part of the bearing 3 in FIG. 1*a* and can rotate around an axis coinciding with the axis of rotation of the shaft 4. In the end member 2 a second sliding bearing 6 is arranged, in which a cam disk 7 is journalled. This bearing is also preferably made of a suitable plastic material. The axis of rotation of the cam disk coincides with the axes of rotation of the shaft 4 and the operating wheel 5.

Figure 1B:
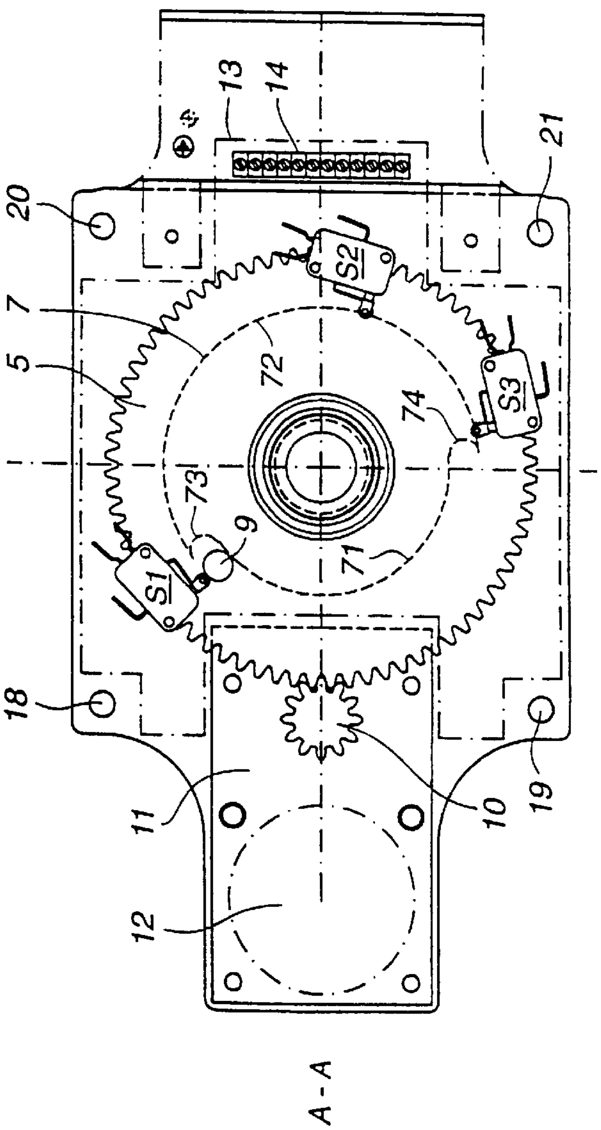
FIG. 1*b* shows the device viewed in the direction of the axes from that side which is intended for mounting to an electric switching device.

The profile of the cam disk has the appearance shown in FIG. 1*b* with a first circular section 71 with a smaller radius and a second circular section 72 with a larger radius. The first section occupies a center angle of about 150° and the second section the remainder of the circumference of the cam disk. The boundaries between the two sections consist of the shoulders 73 and 74. The cam disk has a central hole for the shaft 4, and the cam disk and the shaft are provided with splines which connect the cam disk to the shaft in the direction of rotation.

Between the operating wheel 5 and the cam disk 7, a liner 8 is arranged, for example in the form of a coating on, or an insert in, the operating wheel of a plastic material with low friction. The liner ensures that the cam disk and the operating wheel under all circumstances, even after a lengthy downtime outdoors, are able to move relative to each other with low friction.

On the operating wheel 5, a carrier 9 in the form of a steel pin is arranged. The carrier is arranged such that, during a clockwise movement of the operating wheel in FIG. 1*b,* it may be brought into contact with the shoulder 73 of the cam disk and thereafter move the cam disk with it during continued clockwise movement. The cam disk is shown in the figure in a position displaced in the clockwise direction to be able to show the shape of the shoulder 73. Normally, the pin 9 is in contact with the shoulder 73. In the same way, during a counterclockwise movement of the operating wheel in FIG. 1*b,* the carrier may be brought into contact with the shoulder 74 of the cam disk and thereafter move the cam disk during continued counterclockwise movement.

The operating wheel 5 is in engagement with and is driven by a cylindrical intermediate gear wheel 10 which is journalled in the end members 1 and 2. The intermediate gear wheel 10 is driven via a gearbox 11 from a dc motor 12. The gearbox is adapted to provide a great rotational reduction, for example from a motor speed of about 3000 rpm to a rotational speed of the operating gear wheel of 10 seconds per revolution. Because all the axes of rotation in the operating device are parallel, all the gear wheels of the device, including the gear wheels in the gearbox, may be designed as straight-toothed spur wheels, which provides low friction and low manufacturing costs.

A printed circuit board 13 is mounted inside the end member 1 and supports a terminal block 14, three microswitches S1, S2 and S3 as well as the required electrical connections between these units. The microswitches are placed such that they are influenced by the carrier 9, and a microswitch is activated when the carrier is located in front of the switch. As will be shown below, the switch Sl defines an initial position of the operating wheel 5, and the switches S2 and S3 define end positions for clockwise and counterclockwise movement, respectively, of the operating wheel.

The end members have four mounting holes 18, 19, 20, 21, which are each placed symmetrically in a respective corner. In this way, four different, inverted mounting positions of the operating device are made possible, rotated 180° relative to each other. The operating device is provided with a housing or enclosure (not shown for the sake of clarity), in which further components, for example the relays R1 and R2 shown in FIG. 2, may be mounted.

Figure 2:
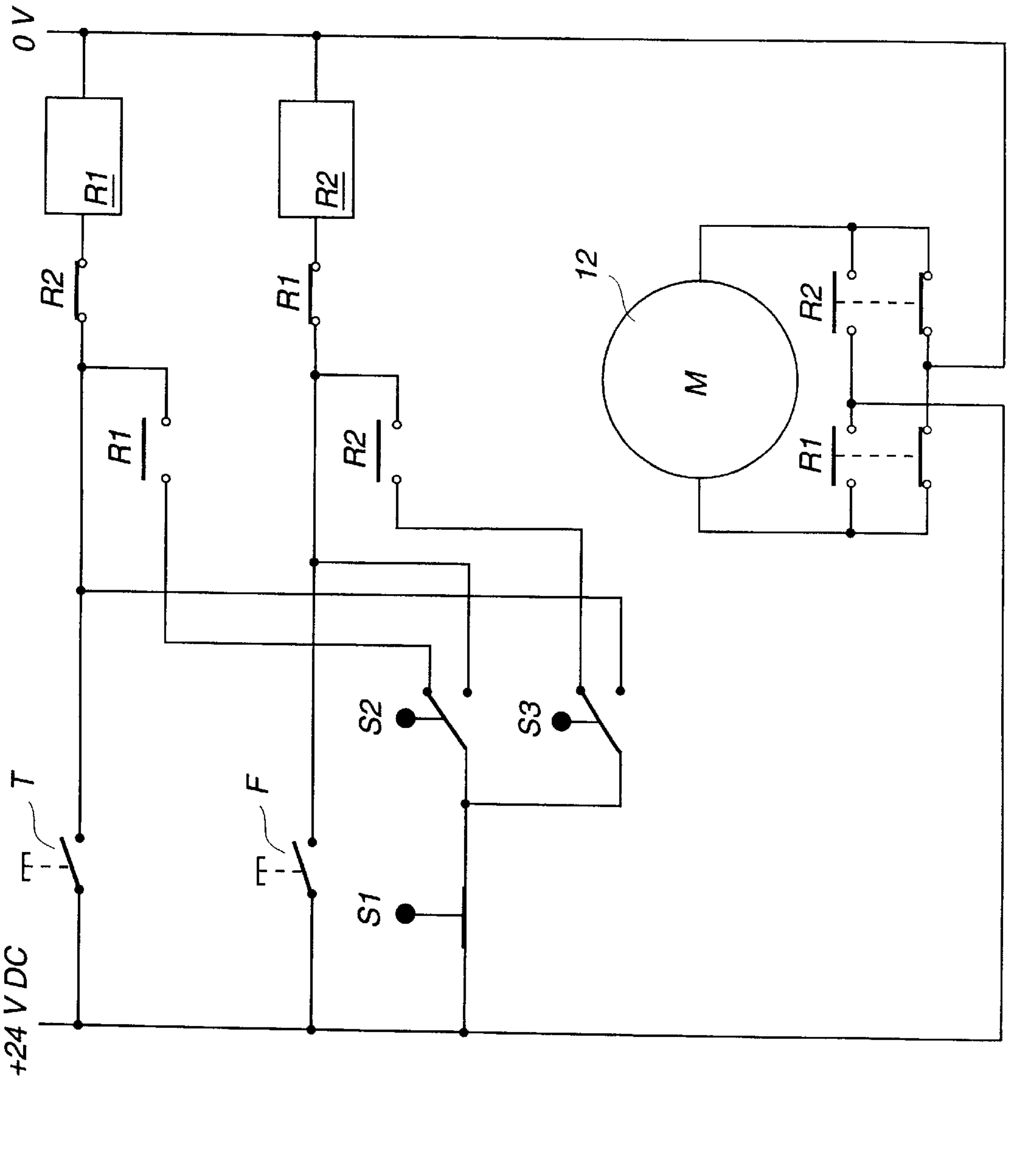
FIG. 2 shows an electric circuit diagram for the operating device.

FIG. 2 shows an electric circuit diagram for the operating device. The device is supplied with +24 V direct voltage, which allows operation from a stand-by battery during interruptions in the ordinary voltage supply. The motor is controlled by means of two dc relays R1 and R2. The relay R1 activates the motor for rotation in one direction for closing of the electric switching device, and the relay R2 activates the motor for rotation in the opposite direction for opening of the electric switching device.

With the aid of the pushbutton T, a closing operation of the switching device is initiated, and with the aid of a pushbutton F, an opening operation of the switching device is initiated.

All the switching devices are shown in FIG. 2 in non-activated positions. Since the two relays R1 and R2 are non-activated, the armature of the motor is short-circuited by two relay contacts as is clear from the figure, whereby the motor, as soon as none of the relays picks up, immediately brakes and stops.

In the initial position, the operating wheel 5 assumes the position shown in FIG. 1*b* where the carrier 9 lies straight in front of and activates the microswitch S1. The contact thereof is then open. The other contacts assume the positions shown in FIG. 2. The cam disk 7 is shown in the figure in the position it assumes when the electric switching device is opened.

For closing operation, the pushbutton T is activated, whereby the relay R1 picks up and the motor starts rotating, and the operating wheel 5 rotates in the clockwise direction in FIG. 1*b*. As soon as the carrier 9 has left the switch S1, the relay R1 becomes self-activated via the contacts S1-S2-R1, and the pushbutton can be released. The carrier is brought to make contact with the shoulder 73 of the cam disk and, under continued rotation, brings the cam disk along with it and hence also the shaft 4 of the electric switching device. During this movement, the operating spring of the electric switching device is tensioned successively. When during this movement a dead-center position of the electric switching device is passed, the closing operation is released, and the shaft 4 and the cam disk move in the clockwise direction. At completed closing movement, the cam disk has moved so far that the shoulder 73 has moved to or past the position which is defined by the switch S2. The motor and the operating wheel continue to rotate until the carrier reaches the switch S2. Switch S2 is activated, and its contact assumes the lower position in FIG. 2. The relay R1 then loses its self-activation and falls, whereby the relay R2 receives voltage via the contacts S1-S2-R1 and picks up. The relay immediately becomes self-activated via the contacts S1-S3-R2. The motor now rotates in the opposite direction, that is, the operating wheel 5 rotates in the counterclockwise direction in FIG. 1*b*. The rotation continues until the carrier reaches the switch S1, whereby the relay R2 loses its self-activation, the relay falls and the motor is braked and stops. The operating wheel and the carrier now again assume the initial position shown in FIG. 1*b*. The cam disk 7 is in such a position that the shoulder 74 is at or somewhat to the left of the carrier in the figure, and the operating device and the electric switching device are ready for an opening operation.

In a corresponding way an opening operation is initiated by activation of the pushbutton F, and the function corresponds to the function during closing. The relay R2 picks up and becomes self-activated, the operating wheel 5 rotates in the counterclockwise direction in FIG. 1*b,* and the carrier 9 comes into contact with the shoulder 74 and brings the cam disk along with it while tensioning the operating spring of the electric switching device. When the dead-center position of the electric switching device has been passed, the opening operation is released, and the cam disk then moves in the counterclockwise direction to the position shown in the figure. The operating wheel continues its rotation until the carrier in its end position activates the switch S3, whereupon the operating wheel and the carrier return to the initial position in the manner described above. The operating device thus permits the electric switching device, while the operating movement is in progress, to complete the operating movement without being obstructed by the operating device.

By the embodiment of the cam disk described above, and since the carrier is adapted to return to the initial position after each operation, the electric switching device can be operated manually with the aid of an operating handle or the like, both in open position for closing of the electric switching device and in closed position for opening the electric switching device, without the operating device obstructing the movement.

Because the direction of rotation of the drive motor of the operating device can be changed in a simple manner, for example by shifting closing and opening signalling, an operating device according to the invention can be used for mounting on an optional side of an electric switching device.

The low required drive motor power in an operating device according to the invention makes possible the use of simple and inexpensive relays for controlling the motor instead of the considerably more expensive contacts which are necessary for higher motor powers.

The simplicity, low cost and mounting flexibility of the operating device make possible the arrangement of remote operation of, for example, switch disconnectors to a considerably greater extent than what has previously been possible in practice. During remote operation, the relays of the operating device are supplied with closing and opening signals, respectively, via a signalling line instead of (or in parallel with) the pushbuttons T and F in FIG. 2.

The operating device according to the invention has been described above with reference to a switch disconnector, but it may alternatively be used for other types of electric switching devices, for example circuit breakers and disconnecting switches.

The operating device and its function have been described with reference to an electric switching device where, while tensioning the operating spring of the electric switching device, the operation is automatically released when a dead-center position of the mechanism of the switching device has been passed. However, the operating device can also be used for tensioning of an operating spring in other types of electric switching devices, for example where an operation is released by a release magnet, or the like, releasing a tensioned operating spring. An operating device according to the invention can also, as an alternative, be used for operation of an electric switching device which has no operating spring and where no requirements for fast operation are made, for example ordinary disconnecting switches. In this connection, it provides the same advantages as those mentioned above.

In the advantageous embodiment described above, the driving part of the carrier means is in the form of a gear wheel with a carrier, and the driven part is in the form of a cam disk. Alternatively, of course, the cam disk may be connected to the drive motor and hence constitute the driving part, in which case the carrier is arranged on the driven part.

In the embodiment shown, the edge of the cam disk 7 is shaped as two circular arcs with different radii. Since it is only the shoulders 73 and 74 of the disk that are brought into contact with the carrier and that have any real function, it is, in principle, irrelevant how the other parts of the disk are shaped. The portion 71 of the disk between the shoulders, however, should be shaped such that the carrier of the operating wheel is able to move freely between the shoulders without coming into contact with the disk. For the same reason, one part of the carrier means need not be in the form of a cam disk, or the other part thereof be in the form of a wheel with a carrier arranged thereon, but both parts of the carrier means may be formed in an arbitrary manner which allows a defined clearance of a suitable size between the two parts.

Although advantageous, the operating device according to the invention is not limited to comprising only a rotating movement. The device can arbitrarily comprise a linear movement or a combination of a linear movement and a rotating movement. The decisive factor is that between the driving part and the driven part there is a play which corresponds to an operating movement.

What is claimed is:

1. An operating device for operation of an electric switching device, consisting of a motor and a carrier, which includes a driving part and a driven part, whereby the motor, via the driving part transmits a movement to the driven part, which is in mechanical connection with the electric switching device, the driving part from an initial position having a closing direction and an opening direction, whereby the driving part returns to the initial position after a completed operation and wherein, between the driving part and the driven part, there is a play which allows a manual operation.

2. An operating device according to claim 1, wherein the driving part comprises a carrier pin which transmits the movement to the driven part in a first direction via a first shoulder arranged in the driven part, and in a second direction via a second shoulder arranged in the driven part, between which shoulders there is arranged a clearance portion in which the carrier pin is freely displaceable corresponding to the movement.

3. An operating device according to claim 1, further comprising a corrosion-inhibiting liner arranged between the driving part and the driven part.

4. An operating device according to claim 1, wherein the driving part comprises an operating wheel and the driven part comprises a cam disk connected to a rotating operating shaft of the electric switching device.

5. An operating device according to claim 4, wherein the operating wheel comprises a gear wheel driven by the drive motor via a gear.

6. An operating device according to claim 1, wherein the clearance portion between the first shoulder and the second shoulder of the driven part is arranged along a circular sector with a tangential extent smaller than half a revolution.

7. An operating device according to claim 4, wherein the axis of rotation of the motor and the axis of rotation of the operating wheel and the cam disk are parallel and that the motor drives the operating wheel via a cylindrical gear.

8. An operating device for an electric switching device, consisting of:

a motor;

a cam disk having first and second shoulders and being coupled to the electric switching device;

an operating wheel driven by the motor from an initial position in an opening direction and in an opposite, closing direction, the operating wheel having a carrier pin which engages the first shoulder and moves the cam disk when the wheel moves in the closing direction and which engages the second shoulder and moves the cam disk when the wheel moves in the opening direction;

wherein a clearance portion is arranged between the first and second shoulders on the cam disk, in which clearance portion the carrier pin is freely moveable, thereby allowing manual operation of said switching device.

9. An operating device according to claim 8 wherein the cam disk is connected to a rotating operating shaft of the electric switching device.

10. An operating device according to claim 8 wherein the cam disk is substantially circular and the first and second shoulders are provided on an outer periphery thereof.

11. A method for operation of an electric switch device comprising the steps of:

moving a driving part from initial position in a closing direction and an opening direction, directed opposite to the closing direction with a drive means;

transmitting movement of the driving part to a driven part which is in mechanical connection with the electric switching device; and returning the driving part to the initial position after completion of an operation, wherein a play is arranged between the driving part and the driven part to permit manual operation of said switching device.

* * * * *